(12) United States Patent
Koren et al.

(10) Patent No.: US 9,248,861 B2
(45) Date of Patent: Feb. 2, 2016

(54) DUNE BUGGY TRACK WIDTH ADAPTER KIT

(71) Applicants: Tal Koren, Moshav Netaim (IL); Haim Levi, Gan Yavneh (IL)

(72) Inventors: Tal Koren, Moshav Netaim (IL); Haim Levi, Gan Yavneh (IL)

( * ) Notice: Subject to any disclaimer, the term of this patent is extended or adjusted under 35 U.S.C. 154(b) by 146 days.

(21) Appl. No.: 13/956,670

(22) Filed: Aug. 1, 2013

(65) Prior Publication Data
US 2014/0035259 A1  Feb. 6, 2014

Related U.S. Application Data

(60) Provisional application No. 61/678,112, filed on Aug. 1, 2012.

(51) Int. Cl.
| | |
|---|---|
| *B62D 21/11* | (2006.01) |
| *B62D 21/12* | (2006.01) |
| *B60G 3/20* | (2006.01) |
| *B62D 21/14* | (2006.01) |
| *B62D 21/18* | (2006.01) |

(52) U.S. Cl.
CPC *B62D 21/11* (2013.01); *B60G 3/20* (2013.01); *B62D 21/12* (2013.01); *B62D 21/14* (2013.01); *B62D 21/183* (2013.01); *B60G 2200/144* (2013.01)

(58) Field of Classification Search
CPC ........ B62D 21/11; B62D 21/12; B62D 21/14; B62D 21/183

USPC .......................................................... 180/209
See application file for complete search history.

(56) References Cited

U.S. PATENT DOCUMENTS

| | | | |
|---|---|---|---|
| 2012/0267185 A1* | 10/2012 | Hirai | 180/291 |
| 2013/0033070 A1* | 2/2013 | Kinsman et al. | 296/190.03 |
| 2013/0175779 A1 | 7/2013 | Kvien et al. | |
| 2014/0035259 A1* | 2/2014 | Koren et al. | 280/638 |

OTHER PUBLICATIONS

OEM Parts-Polaris-Ranger Utility and RZR Sport-2011 Polaris; [retrieved in Apr. 2012]. Retrieved from the Internet: <URL: www.cheapcycleparts.com/oemparts/a/po1/50363094f870023684116502/body-hood-front-body-work>.
OEM Parts-Polaris-Ranger Utility and RZR Sport-2009 Polaris; [retrieved in Apr. 2012]. Retrieved from the Internet: <URL: www.cheapcycleparts.com/oemparts/a/po1/50361f28f870023684115f97/chassis-main-frame-skid-plate>.

* cited by examiner

*Primary Examiner* — Karen Beck
(74) *Attorney, Agent, or Firm* — A.C. Entis-IP Ltd.

(57) ABSTRACT

A suspension superstructure adapted to be mounted to a dune buggy space frame, the space frame having a base frame and configured to support right and left dune buggy wheels at a first track width, the superstructure comprising: right and left frame brackets adapted to be coupled to the base frame; a bridging plate adapted to be connected to the right and left frame brackets; a bumper panel; and right and left wheel control arm supports mounted between the bridging plate and the bumper panel that support control arms of right and left dune buggy wheels so that the wheels have a second track width greater than the first track width.

16 Claims, 9 Drawing Sheets

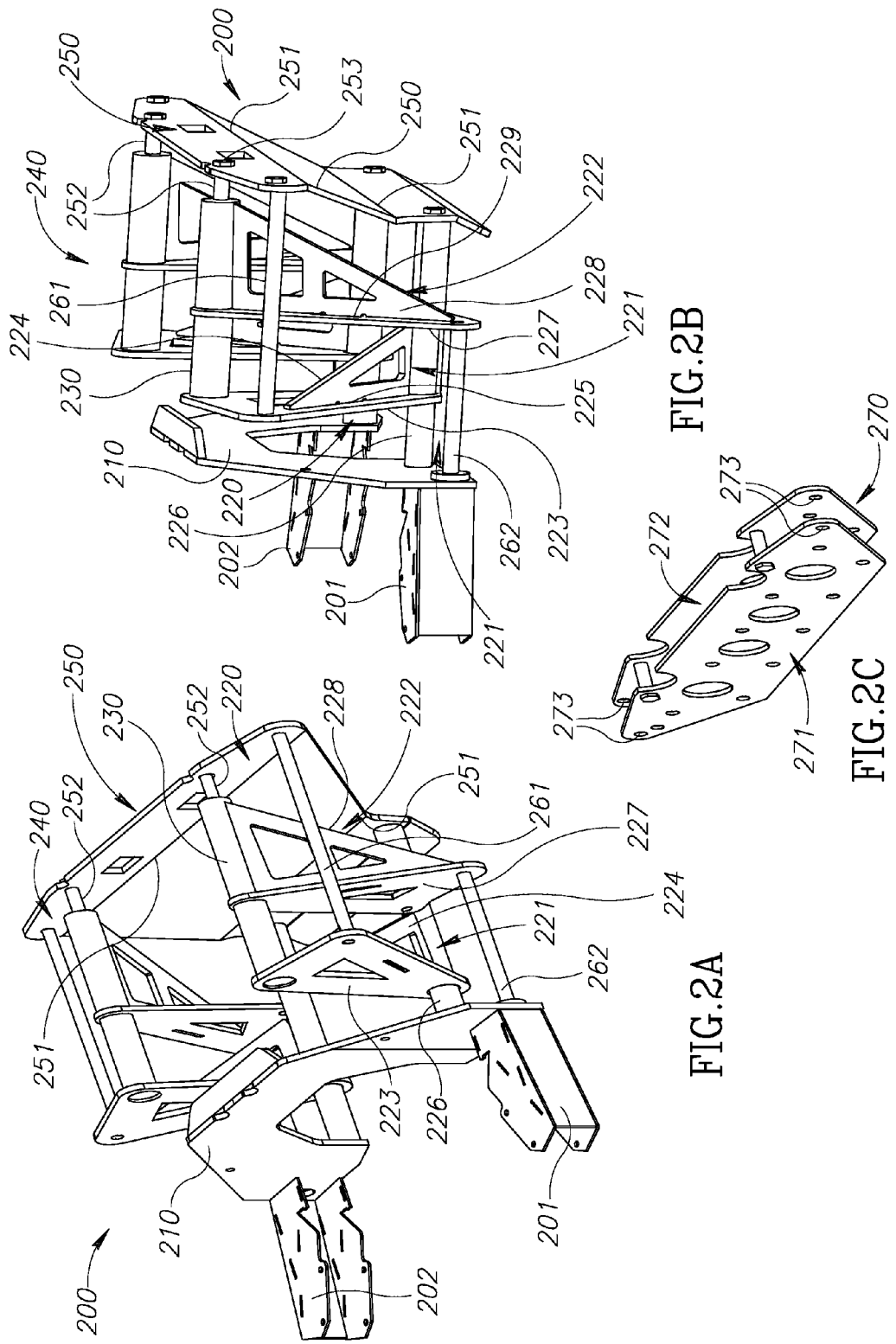

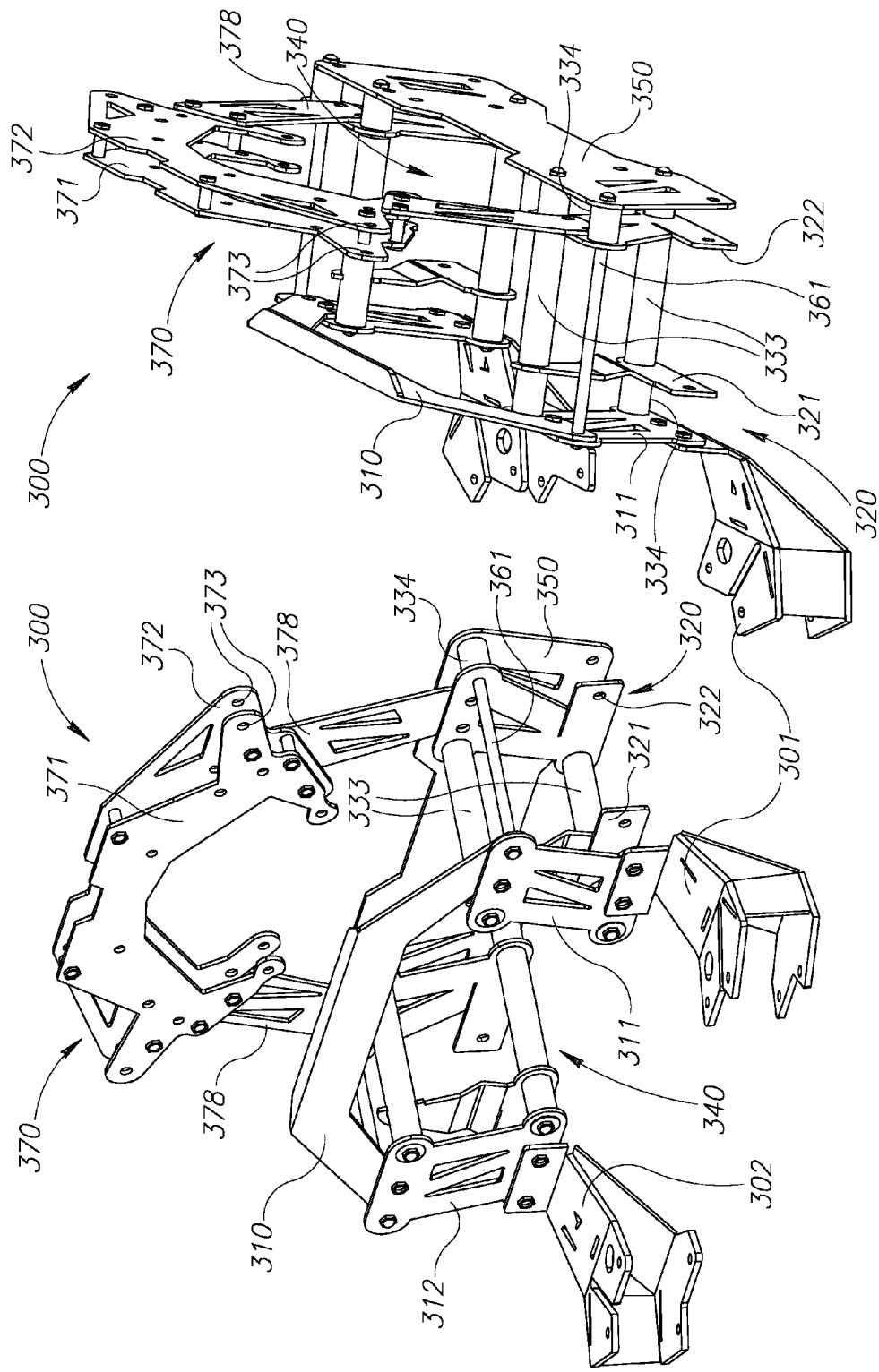

DUNE BUGGY TRACK WIDTH ADAPTER KIT

RELATED APPLICATIONS

The present application claims the benefit under 35 U.S.C. 119(e) of U.S. Provisional Application 61/678,112 filed on Aug. 1, 2012, the disclosure of which is incorporated herein by reference.

TECHNICAL FIELD

Embodiments of the invention relate to adapter kits for modifying the track width and/or the wheel base of an all terrain vehicle.

BACKGROUND

All terrain recreational vehicles, also known as off-road vehicles, dune buggies, and sand rails were originally, used, often beaten up, conventional road vehicles that typically had outlived their useful lives as acceptable road vehicles and were converted for driving on off road, rough terrain, such as desert sand dunes. The development of off road, all terrain recreational vehicles appears to have begun and gained popularity and public notice with old Volkswagen beetles that were frequently converted to recreational off road vehicles, hence the name "dune buggy". Hereinafter, "dune buggy" may be used generically to refer to recreational rough terrain vehicles or vehicles that share characteristics of recreational rough terrain vehicles.

Today, a large variety of kits are available that provide plans for do it yourself dune buggies, and many automotive manufacturers make and market different brands of dune buggies that may be adapted for different types of off road and on road driving. Among automotive manufactures that market dune buggies are by way of example: Polaris, USA; Honda, Harley Davidson, USA; Kawasaki Motors Corp, Suzuki, Berrien; and Peugeot, France. Dune buggies have also been adopted by the military, and specially designed dune buggies, such as the Advanced Light Strike Vehicle, produced by Chenowth Racing Products Inc, of San Diego USA, is in use by various Special Forces units.

A dune buggy often comprises a frame referred to as a "space frame" formed from welded and/or bolted, rectangular or circular, generally mandrel drawn, steel tubing, having a front wheel frame, a passenger compartment frame, and a rear wheel frame that are constructed on a base frame. The front wheel frame is configured to be mounted with a suspension system having control arms, which may be "A arms", that couple to front wheel bearings to which steerable, front wheels of the dune buggy are mounted. For a dune buggy comprising a water cooled motor, the front wheel frame may be configured to house a radiator for cooling the motor. The rear frame provides mounting for a rear wheel suspension system having control arms that couple to rear wheel bearings to which motor driven rear wheels may be mounted. Often the rear frame houses the dune buggy motor that drives the rear wheels. The base frame is often a ladder frame.

Factory and home kit produced dune buggies are often modified by their users to adapt them to special terrains or to enhance their maneuverability and/or stability. Generally, desired modifications are made to increase a track width and/or change a wheel base of the dune buggies, and various kits and accessories are commercially available to make these modifications.

SUMMARY

An aspect of an embodiment of the invention relates to providing front and rear suspension superstructures that are configured to be coupled to a base frame of a dune buggy space frame to provide an increased track width for the dune buggy. In an embodiment of the invention, for a given dune buggy space frame and base frame, the suspension superstructures provide mounting locations for control arms that are wider apart than locations for mounting wheel support arms provided by the space frame.

In an embodiment of the invention, each front and rear superstructure is coupled to the dune buggy base frame by right and left (left and right refer to a left and right side of a driver seated in a dune buggy and facing forward) frame brackets and provides support for control arms to which front and rear dune buggy wheels respectively may be mounted. A bridging plate having a plane substantially perpendicular to a plane of the base frame couples the right frame bracket to the left frame bracket of each suspension superstructure and increases resistance of the superstructure to twisting about an axis perpendicular to the bridging plate plane. Optionally, extension rods connect the front and back superstructures to front and rear bumper panels respectively. The extension rods may support an array of trusses formed having mounting holes for connecting control arms of the dune buggy wheels to the superstructure frames. The front and rear superstructure frames optionally comprise a double panel shock absorber bridge mount that spans from a right to a left side of the superstructure. The bumper panel and/or the shock absorber bridge mount is configured to be rigidly fixed to a cross beam of the dune buggy space frame. Each superstructure provides a relatively rigid, box-like structure for mounting wheel control arms that distributes forces generated at mounting regions of the control arms in the superstructure during driving over rough terrain to the dune buggy base frame.

In an embodiment of the invention, components of each superstructure are formed so that the superstructure may be assembled and attached to a dune buggy space frame substantially without having to remodel the space frame.

There is therefore provided in accordance with an embodiment of the invention a suspension superstructure adapted to be mounted to a dune buggy space frame, the space frame having a base frame and configured to support right and left dune buggy wheels at a first track width, the superstructure comprising: right and left frame brackets adapted to be coupled to the base frame; a bridging plate adapted to be connected to the right and left frame brackets; a bumper panel; and right and left wheel control arm supports mounted between the bridging plate and the bumper panel that support control arms of right and left dune buggy wheels so that the wheels have a second track width greater than the first track width. Optionally, the bridging plate is coupled directly to the frame brackets.

The suspension superstructure right control arm support may comprise: a first crossed truss support having a first pair of welded trusses coupled to the bridging plate by a pivot rod for supporting a bottom control arm of the right dune buggy wheel; and a second crossed truss support having a second pair of welded trusses coupled to the bumper panel by a pivot rod for supporting an upper control arm of the right dune buggy wheel. Optionally, the right control arm support comprises an extension rod that is coupled to the bridging plate and the bumper plate. The extension rod may be welded to the first and second crossed truss supports.

In an embodiment of the invention, the left control arm support is a mirror image of the right control arm support.

In an embodiment of the invention, the suspension superstructure comprises a shock absorber bridge mount mountable to the space frame and configured to support right and left dune buggy wheel shock absorbers.

In an embodiment of the invention, the dune buggy wheels are front wheels.

In an embodiment of the invention, the suspension superstructure comprises right and left frame bracket flanges coupled directly to the frame brackets and wherein the bridging plate is directly coupled to the flanges. The right control arm support optionally comprises: first and second control arm mounting brackets; and first and second extension rods which support the first and second control arm mounting brackets and are coupled to the right frame bracket flange and the bumper panel. Optionally, the first and second extension rods are welded to the first and second control arm mounting brackets. Optionally, the second control arm mounting bracket is coupled to the right frame bracket flange and the bumper plate by a pivot rod that supports an upper control arm of the right dune buggy wheel. The first and second control arm mounting brackets are optionally formed having matching through holes for receiving a pivot rod that supports a bottom control arm of the right dune buggy wheel.

In an embodiment of the invention, the left control arm support is a mirror image of the right control arm support. The suspension superstructure may comprise: a shock absorber bridge mount configured to anchor right and left wheel shock absorbers; and right and left bridge mount flanges that connect the shock absorber bridge mount to the second control arm mounting bracket of the right and left control arm supports.

In an embodiment of the invention, the dune buggy wheels are back wheels.

There is further provided in accordance with an embodiment of the invention a kit comprising components of a suspension superstructure for assembly to a dune buggy in accordance with an embodiment of the invention.

There is further provided in accordance with an embodiment of the invention, a method of increasing the track width of a dune buggy space frame, the space frame having a base frame and configured to support right and left dune buggy wheels at a first track width the method comprising: mounting right and left frame brackets to the base frame; and coupling right and left wheel control arm supports to the right and left frame brackets respectively.

Coupling the right and left wheel control arm supports to the right and left frame brackets optionally comprises coupling the supports directly to the right and left frame brackets. Coupling the right and left wheel control arm supports may comprise coupling right and left bracket flanges respectively to the right and left frame brackets, and coupling the right and left wheel control arm supports respectively to the right and left bracket flanges.

In an embodiment of the invention the method comprises coupling a bridging plate to the left and right frame brackets.

In an embodiment of the invention the method sequentially mounting the right and left frame brackets to the base frame, coupling the bridging plate to the right and left brackets and coupling the right and left wheel control arm supports to the right and left frame brackets respectively.

"Coupling" may refer to any method of directly or indirectly mechanically attaching a first element to a second element so that a constraint is generated that limits motion of the first element relative to the second element. The coupling may rigidly fix the first element to the second element or allow some form of relative motion between the first and second elements. By way of example, coupling the first element to the second element may refer to welding, or bolting the elements together directly or via an intermediate element. By way of further example, coupling may also refer to supporting the first element by a shaft that communicates with the first and second elements and allows rotation of the elements relative to each other.

In the discussion unless otherwise stated, adjectives, such as "substantially" and "about", modifying a condition or relationship characteristic of a feature or features of an embodiment of the invention, are understood to mean that the condition or characteristic is defined to within tolerances that are acceptable for operation of the embodiment for an application for which it is intended.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

FIGS. 2A and 2B schematically show different perspective views of a front suspension superstructure for supporting front wheel suspension components that provides increased track width for front dune buggy wheels, in accordance with an embodiment of the invention;

FIG. 2C schematically shows a shock absorber mount for use with the front suspension superstructure shown in FIGS. 2A and 2B, in accordance with an embodiment of the invention;

FIGS. 3A and 3B schematically show different perspective views of a rear suspension superstructure for supporting rear wheel suspension components that provides increased track width for rear dune buggy wheels, in accordance with an embodiment of the invention;

DETAILED DESCRIPTION

Figure 1A:
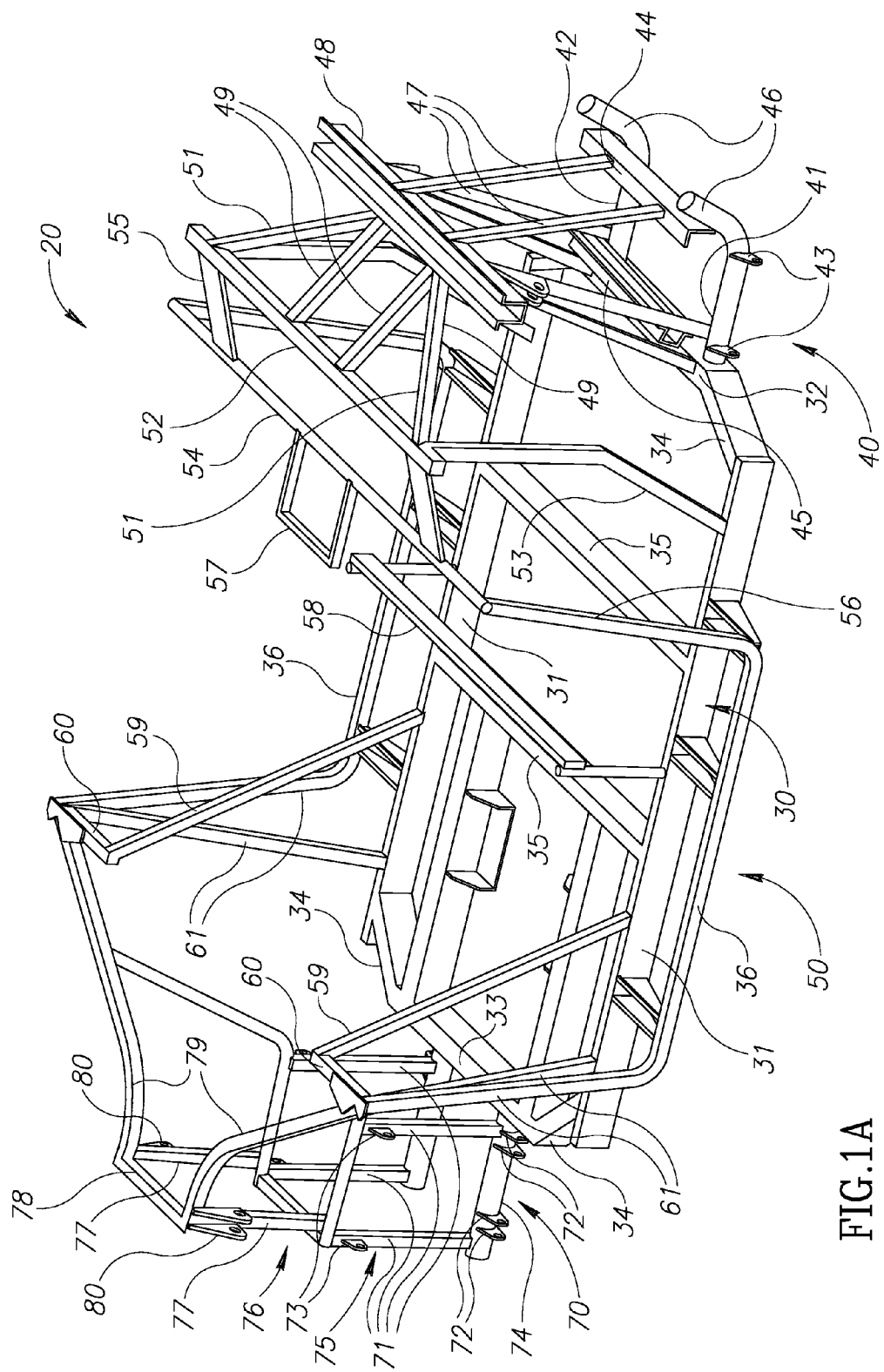
FIG. 1A schematically shows a space frame of a conventional dune buggy.

FIG. 1A schematically shows a space frame 20 of a side by side dune buggy (not shown) similar to a space frame of a conventional dune buggy that may be commercially available. Space frame 20 comprises a base frame 30 having longitudinal rails 31 and front and back cross-bars 32 and 33 respectively connected to the rails by relatively short "corner" tubes 34. Base frame 30 is by way of example a ladder frame comprising mid-frame cross-bars 35. A front wheel frame 40, a side by side passenger compartment frame 50, and a rear wheel frame 70 are constructed on base frame 30. Front wheel frame 40 is configured to be mounted with a suspension system that supports steerable, front wheels of the dune buggy. Passenger compartment 50 is configured to provide supporting structures for passenger seating, control and a dashboard. Rear wheel frame 70 is configured to be mounted with a suspension system that supports rear wheels of the dune buggy that are optionally driven by a rear mounted motor (not shown) housed in the rear wheel frame.

In the figures and following description, all features and possible components of space frame 20 are not shown and/or described, and generally only features that are necessary for, or contribute to, understanding embodiments of the invention are shown and discussed.

Front wheel frame 40 optionally comprises right and left bottom control arm tubes 41 and 42 respectively, comprising control arm mounting brackets 43 for mounting front wheel bottom control arms. Front wheel frame also may comprise front and back top control arm cross-bar mounts 44 and 45 respectively, having mounting holes and or brackets (not shown) for mounting front wheel top control arms. Bumper guard tubes 46 curve upward from ends of control arm tubes 41 and 42 and provide protection for dune buggy components mounted to front wheel frame 40. For example, if the rear mounted motor assumed to drive rear wheels mounted to rear wheel frame 70 is assumed to be water cooled, bumper guard tubes 46 may function to support and protect a radiator mounted at a foremost location in the front wheel frame. Support struts 47 connect control arm cross-bar mounts 44 and 45 to a shock absorber cross-bar mount 48. Support and web struts 49 and 51 respectively connect the shock absorber cross-bar mount to a top dashboard cross-bar 52.

Top dashboard cross-bar 52 is part of passenger compartment 50 and is connected to base frame longitudinal rails 31 by upright struts 53 and to a bottom dashboard cross-bar 54 by struts 55. Bottom dashboard cross-bar 54 is connected to running board rails 36 by upright struts 56 and supports a steering wheel mount 57. Passenger compartment 50 comprises a passenger seat mounting cross-bar 58 and back rest support struts 59 connected to short cross stubs 60 supported by upright struts 61 mounted respectively to base frame longitudinal rails 31 and running board rails 36.

Rear wheel frame 70 comprises upright struts 71 having lower mounting brackets 72 for mounting rear wheel bottom control arms to the mounting frame and upper mounting brackets 73 for mounting rear wheel top control arms to the rear wheel frame. Upright struts 71 and horizontal support struts 74 that extend from back cross-bar 33 form a motor cage 75 for mounting and supporting a motor (not shown) that drives rear wheels held by control arms mounted to rear wheel frame 70. An exhaust cage 76 for housing an exhaust system (not shown) for a motor mounted in motor cage 75, is constructed over the motor cage and comprises upper portions of upright struts 71, a back strut 78 and optionally curved holding struts 79 that are connected to back strut 78 and short cross stubs 60 and hold exhaust cage 76 and motor cage 75 to passenger compartment frame 50. Each upright strut 77 comprises a pair of rear shock absorber mounting brackets 80.

Figure 1B:
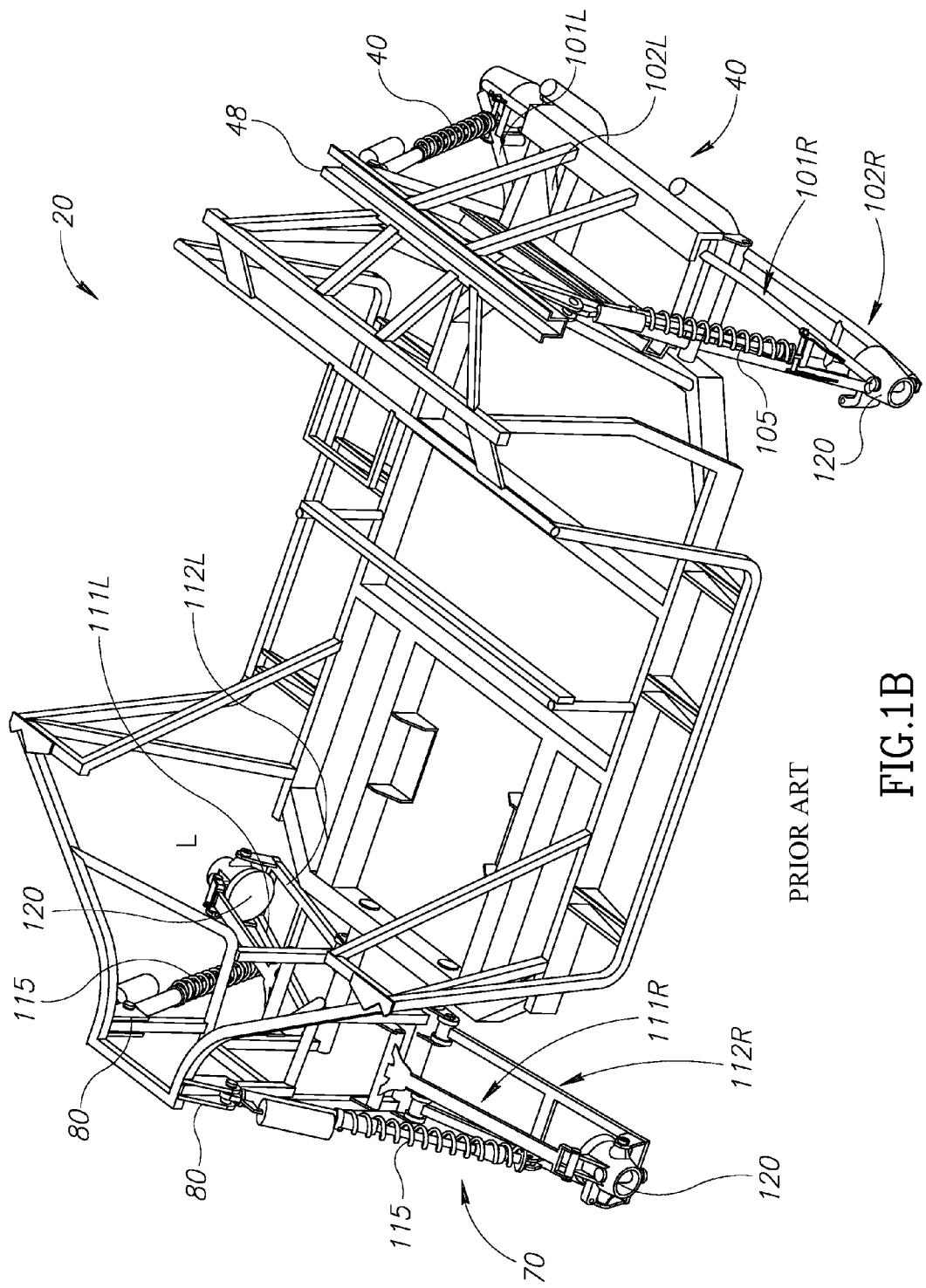
FIG. 1B schematically shows the dune buggy space frame shown in FIG. 1A having wheel control arms mounted to the space frame.

FIG. 1B schematically shows right front wheel top and bottom control arms 101R, 102R, respectively, and left front wheel top and bottom control arms 101L, 102L respectively, mounted to front wheel frame 40. Right and left rear wheel top and bottom control arms 111R, 112R, 111L, and 112L respectively are mounted to rear wheel frame 70. Each pair of top and bottom control arms hold a wheel bearing 120 to which a dune buggy wheel associated with the pair of arms may be mounted. A front shock absorber 105 is mounted to shock absorber cross-bar mount 48 and to each front wheel top control arm 101R and 101L. A rear shock absorber 115 is mounted to each rear wheel top control arm 112R and 112L and to a shock absorber bracket 80.

Figure 1C:
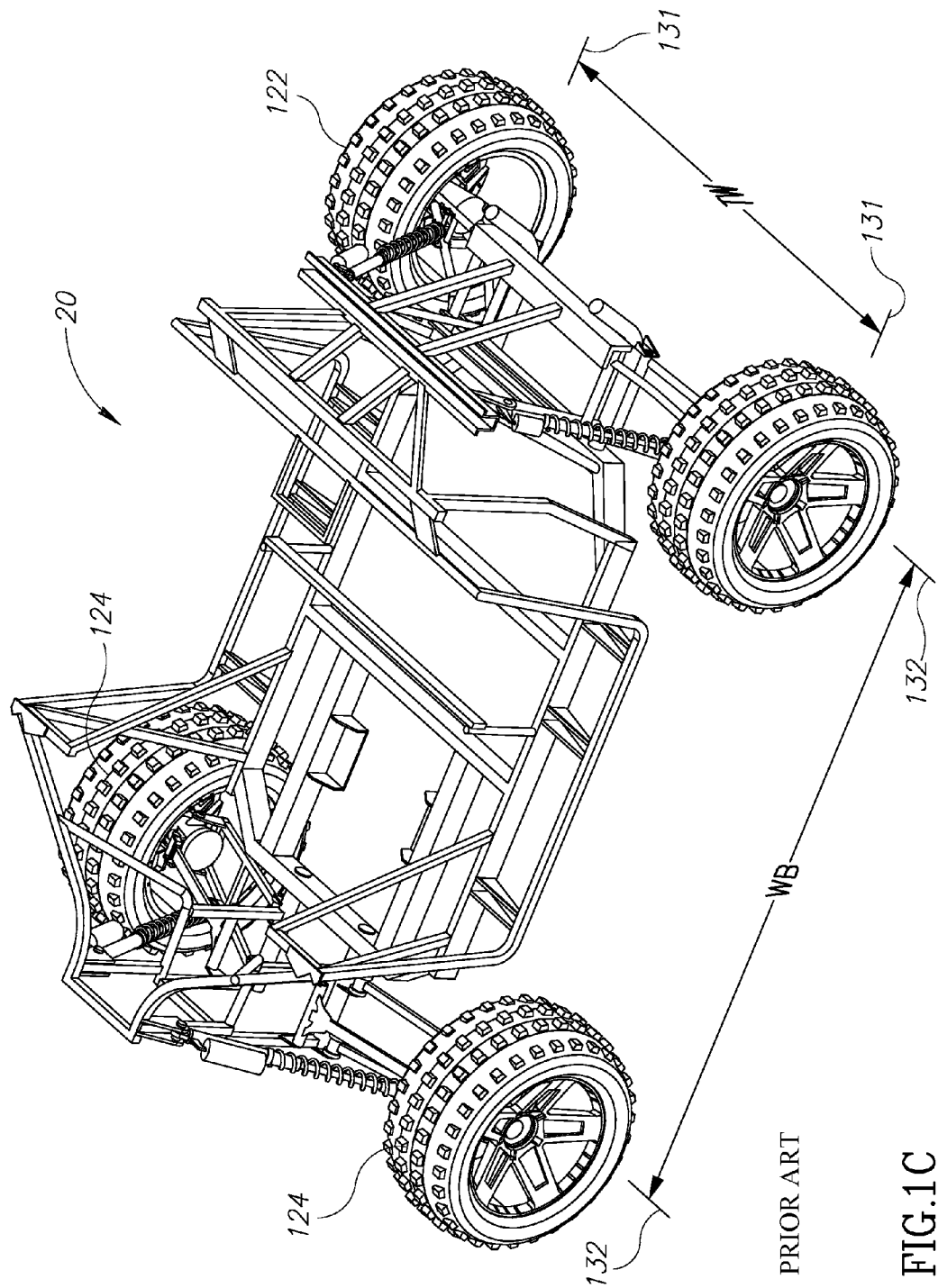
FIG. 1C schematically shows the dune buggy space frame shown in FIG. 1B having wheels mounted to the wheel control arms.

FIG. 1C schematically shows dune buggy front wheels 122 and dune buggy rear wheels 124 mounted to the control arms shown in FIG. 1B. A distance between centers of front wheels 122 or centers of rear wheels 124 is referred to as a track width of a dune buggy comprising space frame 20. Track width for front wheels 122 of space frame 20 is indicated in FIG. 1C as a distance "TW" between witness lines 131. A distance between centers of a front wheel and a rear wheel on a same side of a dune buggy is referred to as a wheel base of the dune buggy. A wheel base for space frame 20 is indicated in FIG. 1C as a distance "WB" between witness lines 132. By way of a numerical example, assuming that space frame 20 is suited for a dune buggy such as the Polaris, Ranger RZR 800 dune buggy, TW may be equal to about 127 cm (centimeters) and WB may be equal to about 196 cm.

FIGS. 2A and 2B schematically show different perspective views of a front suspension superstructure 200 for mounting to a dune buggy space frame, such as space frame 20 shown in FIGS. 1A-1C and providing the dune buggy with increased track width for front wheels of the dune buggy, in accordance with an embodiment of the invention. FIGS. 2A and 2B schematically show superstructure 200 assembled from separate modular components into which it may be partitioned as it appears after mounting to dune buggy space frame 20. FIGS. 4A-5B schematically show front suspension superstructure 200 mounted to space frame 20, in accordance with an embodiment of the invention.

A same suspension superstructure, such as by way of example front suspension superstructure 200, in accordance with an embodiment of the invention, may be partitioned into modular components in more than one way. In an embodiment of the invention, assembly of superstructure 200 is performed by sequentially mounting and bolting and/or welding the modular components to space frame 20 and/or to components of the superstructure previously mounted to the space frame. A given partitioning of the superstructure may be configured to enable relatively easy assembly of the superstructure to a given space frame or to minimize an amount of remodeling that might have to be done to mount the superstructure to the space frame.

Front suspension superstructure 200 optionally comprises right and left base frame brackets 201 and 202 respectively for mounting the superstructure to base frame 30 of space frame 20 (FIG. 1A-1C), a bridging plate 210, right and left front wheel control arm supports 220 and 240 respectively, and a front bumper panel 250. Base frame brackets 201 and 202 may be configured to be mounted to base frame 30 by welding and/or bolting to longitudinal rails 31, (FIGS. 1A-1C, FIGS. 4A-5B) front cross-bar 32, and/or short corner tubes 34 of the base frame. Bridging plate 210 may be bolted and/or welded to base frame brackets 201 and 202 after the base frame brackets are mounted to base frame 30.

Right front wheel control arm support 220 comprises first and second crossed truss supports 221 and 222 respectively. First crossed truss support 221 optionally comprises a pair of trusses 223 and 224 oriented at 90° to each other and welded together along a seam 225 (FIG. 2B) where they meet, and an extension rod 226 welded to trusses 223 and 224. Extension rod 226 may be formed having a through hole (not shown) for receiving a tie rod used to clamp together components of front suspension superstructure 200. Similarly, second crossed truss support 222 optionally comprises a pair of trusses 227 and 228 oriented at 90° to each other and welded together along a seam 229 (FIG. 2B) where they meet, and an extension rod 230 welded to truss 227 and 228. Extension rods 230 are optionally formed having a through hole for receiving a tie rod used to clamp together components of front suspension superstructure 200.

In an embodiment of the invention, first and second crossed truss supports 221 and 222 are mounted to base frame brackets 201 and 202, and/or bridging plate 210 after the base frame brackets and bridging plate 210 have been mounted to space frame 20. Optionally, first and second crossed truss supports are welded together before being mounted to front suspension superstructure 200.

Left front wheel control arm support 240 is similar to right front wheel control arm support 220 and is optionally a mirror image of the right front wheel control arm support.

Figure 5A:
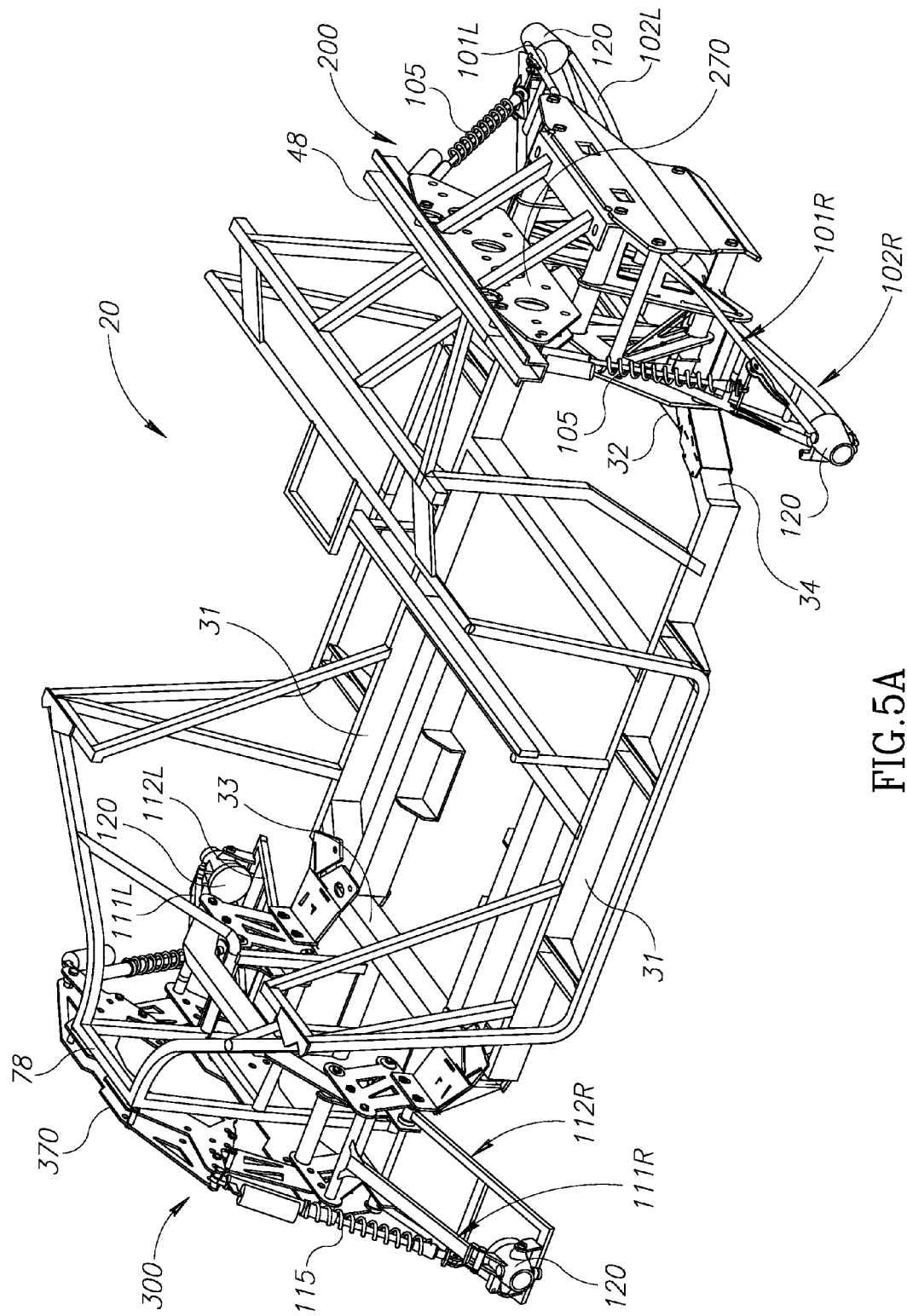
FIG. 5A schematically shows a perspective view of the dune buggy space frame shown in FIGS. 1A and 1B mounted with wheel control arms and shock absorbers, in accordance with an embodiment of the invention.
Figure 5B:
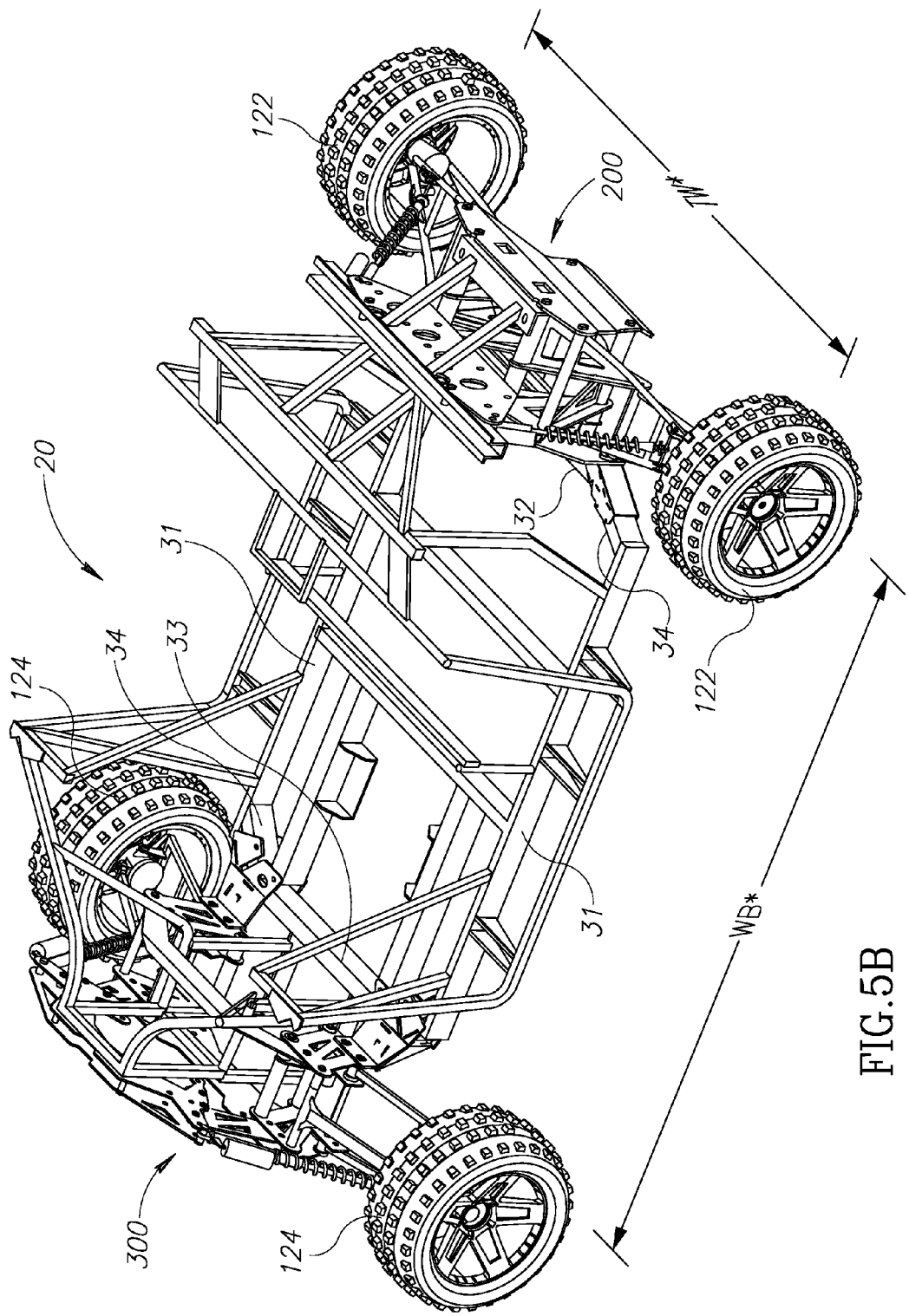
FIG. 5B schematically shows a view of the dune buggy frame and suspension superstructures shown in FIG. 5A having wheels mounted to the superstructures, in accordance with an embodiment of the invention.

Front bumper panel 250 is optionally bent along bend lines 251 to accommodate bumper guard tubes 46 (FIG. 1A) of space frame 20. Optionally, the bumper panel is mounted to front suspension superstructure 200 by clamping the bumper panel to left and right front wheel control arm supports 220 and 240 and to bridging plate 210 by plurality of tie rods. Portions of two tie rods 252 of the plurality of tie rods are shown in FIGS. 2A and 2B, and ends 253 of tie rods used to mount front bumper panel 250 to front suspension superstructure 200 are schematically shown in FIG. 2B. Front bumper panel 250 and first crossed truss support 221 support a top pivot rod 261 to which a top front wheel control arm may be mounted, and second crossed truss support 222 and bridging plate 210 support a bottom pivot rod 262 to which a bottom front wheel control arm may be mounted. Top and bottom control arms mounted to front suspension superstructure 200 are schematically shown in FIGS. 5A and 5B.

FIG. 2C schematically shows a front shock absorber bridge mount 270 for mounting right and left front shock absorbers for front wheels mounted to front suspension superstructure 200, in accordance with an embodiment of the invention. Front shock absorber bridge mount 270 comprises first and second panels 271 and 272 configured to be mounted to a cross-bar of space frame 20, in accordance with an embodiment of the invention. First and second panels are optionally formed having mirror image mounting holes 273 for mounting top ends of right and left front shock absorbers to the panels. FIGS. 4A-5B schematically show shock absorber bridge mount 270 mounted to space frame 20, in accordance with an embodiment of the invention.

FIGS. 3A and 3B schematically show different perspective views of a rear suspension superstructure 300 for mounting to a dune buggy space frame, such as space frame 20 shown in FIGS. 1A-1C and providing the dune buggy with increased track width for rear wheels of the dune buggy, in accordance with an embodiment of the invention. FIGS. 3A and 3B schematically show rear suspension superstructure 300 assembled from separate modular components into which it may be partitioned as it appears after mounting to dune buggy space frame 20. FIGS. 4A-5B schematically show rear suspension superstructure 300 mounted to space frame 20, in accordance with an embodiment of the invention.

Rear suspension superstructure 300 comprises left and right (left and right refer to a left and right side of a driver seated in a dune buggy and facing forward) rear base frame brackets 301 and 302 respectively, a rear bridge panel 310 configured to be mounted to base frame brackets 301 and 302 by left and right flanges 311 and 312 respectively. Left and right rear wheel control arm supports 320 and 340 respectively connect a rear bumper panel 350 optionally to right and left flanges 311 and 312.

Left wheel control arm support 320 comprises first and second control arm mounting brackets 321 and 322 respectively that are supported by extension rods 333 and bushings 334. Optionally, the extension rods and bushings are formed having through holes for receiving tie rods that clamp rear bumper panel 350 to left flange 311. A right upper tie rod 361 of the tie rods that clamp rear bumper panel 350 to right flange 311 optionally functions as a pivot rod for a top rear right wheel control arm. Right rear wheel control arm support 340 is optionally a mirror image of right rear wheel support 320.

A rear shock absorber bridge mount 370 for mounting left and right rear shock absorbers for rear wheels mounted to rear suspension superstructure 300 is connected to left and right rear wheel control arm supports by flanges 378. Rear shock absorber bridge mount 370 comprises first and second panels 371 and 372 configured to be mounted to a cross-bar, for example cross bar 78 (FIGS. 1A, 4A-5B) of space frame 20, in accordance with an embodiment of the invention. First and second panels 371 and 372 are formed optionally having mirror image mounting holes 373 for mounting top ends of right and left rear shock absorbers to the panels. FIGS. 4A-5B schematically show rear shock absorber bridge mount 370 mounted to space frame 20, in accordance with an embodiment of the invention.

Figure 4A:
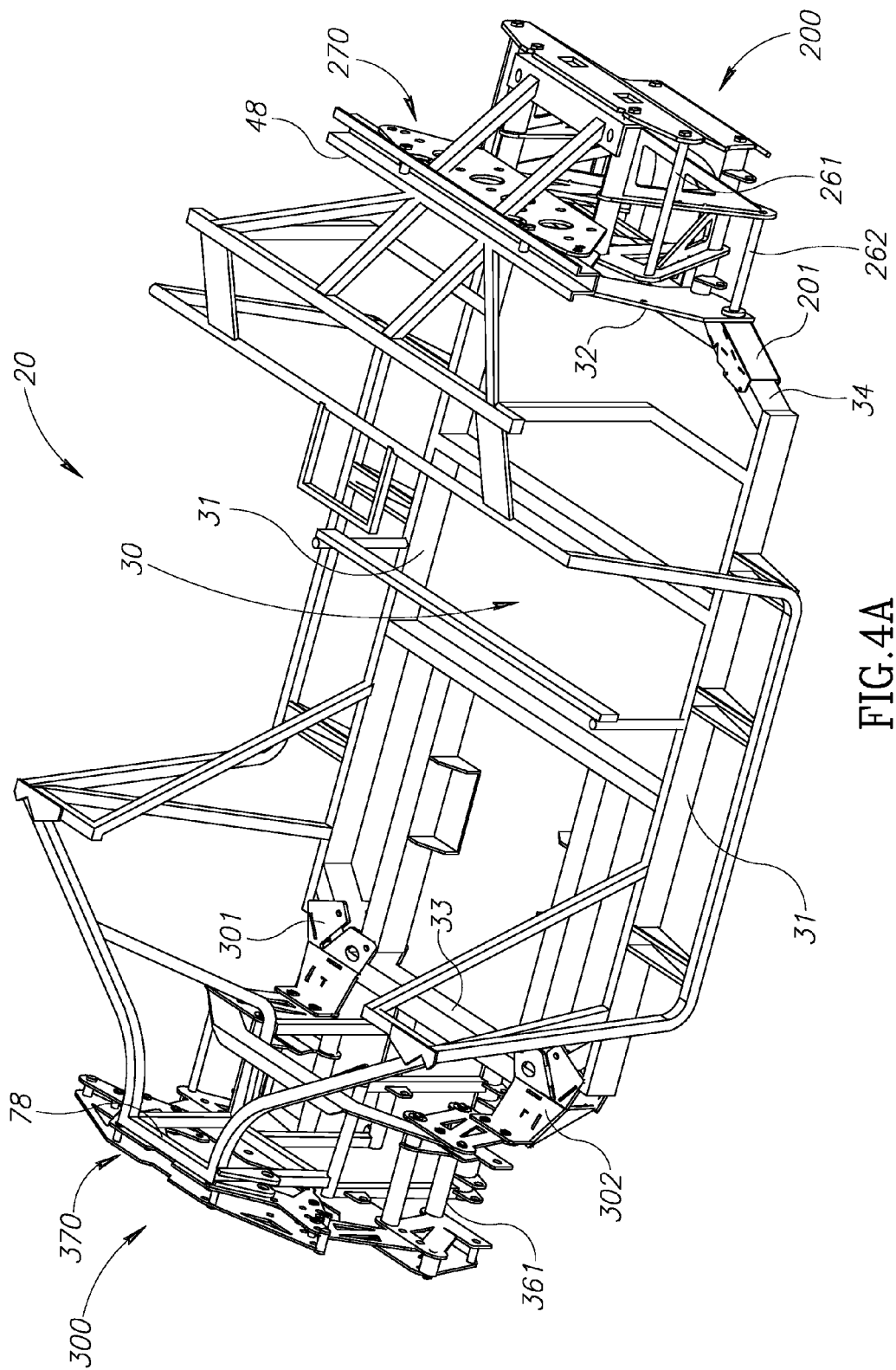
FIGS. 4A and 4B schematically shows perspective views of the front and rear suspension superstructures respectively mounted to the dune buggy space frame shown in FIGS. 1A and 1B, in accordance with an embodiment of the invention.
Figure 4B:
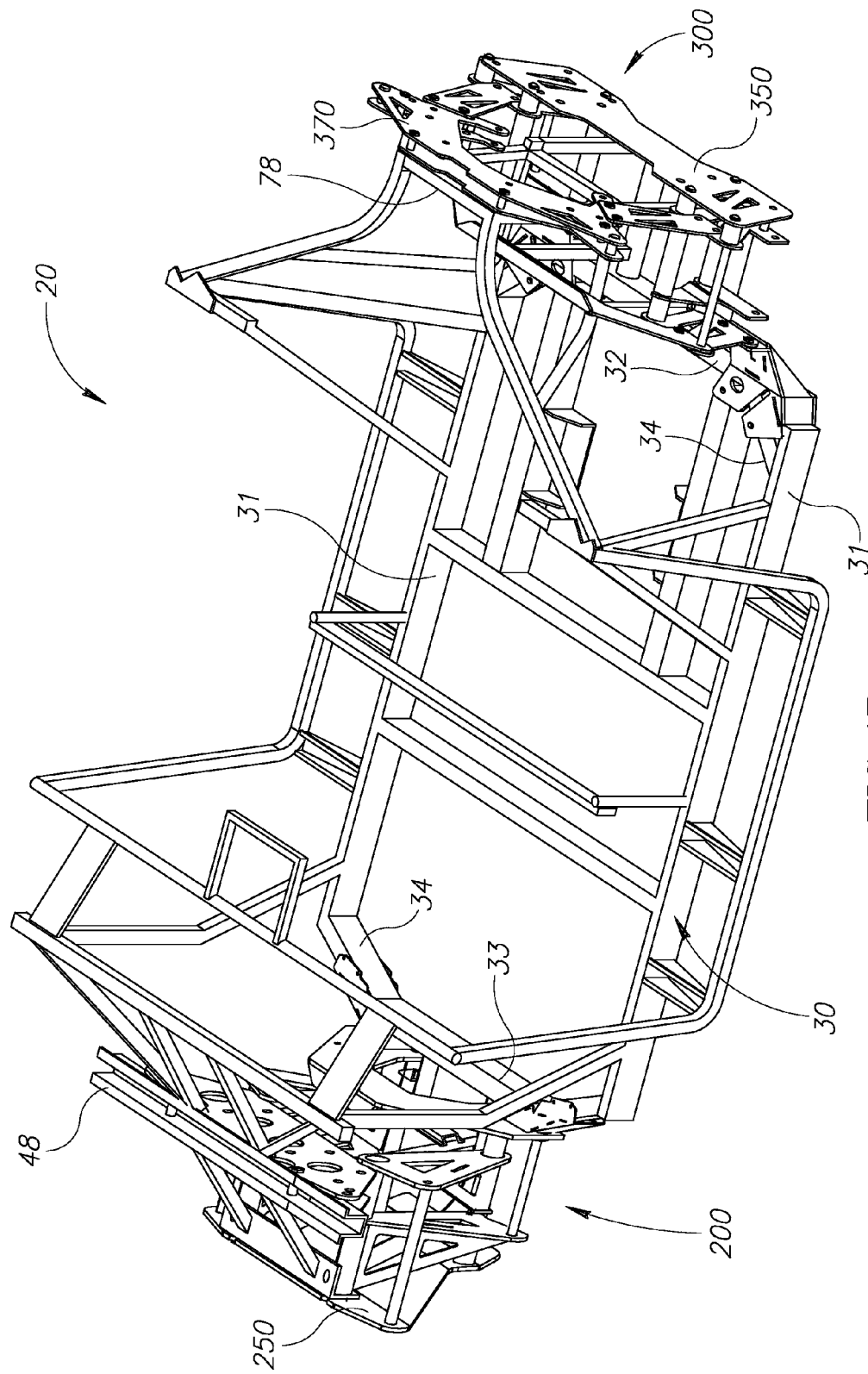

FIGS. 4A and 4B schematically show different perspective views of space frame 20 mounted with front and rear suspension superstructures 200 and 300 in accordance with an embodiment of the invention. Front suspension superstructure 200 is mounted to base frame 30 of space frame 20 by base frame brackets 201 and 202 and optionally has front shock absorber bridge mount 270 bolted or welded to shock absorber cross-bar mount 48. Rear suspension superstructure 300 is mounted to base frame 30 of space frame 20 by base frame brackets 301 and 302 and optionally has rear shock absorber bridge mount 370 bolted or welded to back strut 78.

FIG. 5A schematically shows space frame 20 having front and rear suspension superstructures 200 and 300 to which wheel control arms are connected in accordance with an embodiment of the invention. The figure shows top and bottom right and left, front wheel control arms 101R, 102R, 101L, 102L connected to front suspension superstructure 200 and a front wheel shock absorber 105 connected to each of right and left front wheel top control arms 101R and 101L and front shock absorber bridge mount 270. The top and bottom right front wheel control arms 101R and 102R are coupled to a wheel bearing 120, as are top and bottom left front control arms 101L and 102L. In the perspective of the figure a front wheel shock absorber 105 is shown connected to front shock absorber bridge mount 270 and top left front wheel control arm 101L. FIG. 5A also shows top and bottom right and left rear wheel control arms 111R, 112R, 111L, and 112L connected to rear suspension superstructure 300 and a rear wheel shock absorber 115 connected to each of right and left rear wheel bottom control arm 112R and 112L and rear shock absorber bridge mount 370. Right rear wheel control arms 111R, 112R, and left rear wheel control arms 111L, 112L are coupled to wheel bearings 120.

A distance between right front control arms, 101R and 102R, and left front control arms, 101L and 102L, mounted to front suspension superstructure 200 in accordance with an embodiment of the invention, is greater than a distance between the right and left control arms when they are conventionally mounted to space frame 20 as shown in FIG. 1B. Similarly a distance between right rear control arms, 111R and 112R, and left rear control arms, 111L and 112L, mounted to rear suspension superstructure 300, in accordance with an embodiment of the invention, is greater than a distance between the right and left control arms when they are conventionally mounted to space frame 20 as shown in FIG. 1B. As a result, a track width of dune buggy wheels mounted to wheel bearings 120 supported by the control arms mounted to front and rear suspension superstructures 200 and 300, is increased relative to dune buggy wheels supported by the control arms when conventionally mounted space frame 20.

FIG. 5B schematically shows dune buggy front wheels 122 and dune buggy rear wheels 124 mounted to the control arms shown in FIG. 5A. Track width and wheel base of the dune buggy space frame mounted with suspension superstructures 200 and 300 are indicated as TW* and WB* respectively. By way of a numerical example, assuming that space frame 20 is suited for a dune buggy such as the Polaris, Ranger RZR 800 dune buggy, TW* may be equal to about 146 cm (millimeters) and WB* may be equal to about 202 cm In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A suspension superstructure adapted to be mounted to a dune buggy space frame, the space frame having a base frame and configured to support right and left dune buggy wheels at a first track width, the superstructure comprising:
   right and left frame brackets adapted to be coupled to the base frame;
   a bridging plate adapted to be connected to the right and left frame brackets;
   a bumper panel; and
   right and left wheel control arm supports mounted between the bridging plate and the bumper panel that support control arms of right and left dune buggy wheels, right control arm support comprises a first crossed truss support having a first pair of welded trusses coupled to the bridging plate by a pivot rod for supporting a bottom control arm of the right dune buggy wheel, and a second crossed truss support having a second pair of welded trusses coupled to the bumper panel by a pivot rod for supporting an upper control arm of the right dune buggy wheel;
so that the wheels have a second track width greater than the first track width.

2. A suspension superstructure according to claim 1 wherein the bridging plate is coupled directly to the frame brackets.

3. A suspension superstructure according to claim 1 wherein the right control arm support comprises an extension rod that is coupled to the bridging plate and the bumper plate.

4. A suspension superstructure according to claim 3 wherein the extension rod is welded to the first and second crossed truss supports.

5. A suspension superstructure according to claim 1 wherein the left control arm support is a mirror image of the right control arm support.

6. A suspension superstructure according to claim 1 and comprising a shock absorber bridge mount mountable to the space frame and configured to support right and left dune buggy wheel shock absorbers.

7. A suspension superstructure according to claim 6 wherein the dune buggy wheels are front wheels.

8. A suspension superstructure according to claim 1 and comprising right and left frame bracket flanges coupled directly to the frame brackets and wherein the bridging plate is directly coupled to the flanges.

9. A suspension superstructure according to claim 8 wherein the right control arm support comprises:
   first and second control arm mounting brackets; and
      first and second extension rods which support the first and second control arm mounting brackets and are coupled to the right frame bracket flange and the bumper panel.

10. A suspension superstructure according to claim 9 wherein the first and second extension rods are welded to the first and second control arm mounting brackets.

11. A suspension superstructure according to claim 10 wherein the second control arm mounting bracket is coupled to the right frame bracket flange and the bumper panel by a pivot rod that supports an upper control arm of the right dune buggy wheel.

12. A suspension superstructure according to claim 11 wherein the first and second control arm mounting brackets are formed having matching through holes for receiving a pivot rod that supports a bottom control arm of the right dune buggy wheel.

13. A suspension superstructure according to claim 9 wherein the left control arm support is a mirror image of the right control arm support.

14. A suspension superstructure according to claim 13 and comprising:
   a shock absorber bridge mount configured to support right and left wheel shock absorbers; and
   right and left bridge mount flanges that connect the shock absorber bridge mount to the second control arm mounting bracket of the right and left control arm supports.

15. A suspension superstructure according to claim 14 wherein the dune buggy wheels are back wheels.

16. A kit comprising components of a suspension superstructure for assembly to a dune buggy according to claim 1.

* * * * *